United States Patent [19]

Parente

[11] Patent Number: 5,721,402
[45] Date of Patent: Feb. 24, 1998

[54] NOISE SUPPRESSION SYSTEM FOR A JET ENGINE

[75] Inventor: Charles A. Parente, Oyster Bay, N.Y.

[73] Assignee: Northrop Grumman Corporation, Los Angeles, Calif.

[21] Appl. No.: 709,893

[22] Filed: Sep. 9, 1996

[51] Int. Cl.[6] .......................... B64D 33/02; B64C 21/06
[52] U.S. Cl. .................... 181/214; 181/220; 181/292; 244/207; 244/130
[58] Field of Search .......................... 181/213, 214, 181/220, 221, 222, 286, 288, 290, 292, 294; 244/207, 208, 209, 130

[56] References Cited

U.S. PATENT DOCUMENTS

| | | |
|---|---|---|
| 3,085,740 | 4/1963 | Wagner . |
| 3,161,377 | 12/1964 | Balluff . |
| 3,261,576 | 7/1966 | Valyi ............................ 244/13 C |
| 3,584,812 | 6/1971 | Brenman et al. ............... 244/130 X |
| 3,604,661 | 9/1971 | Mayer, Jr. . |
| 3,820,628 | 6/1974 | Hanson ........................ 181/214 |
| 4,465,725 | 8/1984 | Riel . |
| 4,539,244 | 9/1985 | Beggs et al. . |
| 4,539,245 | 9/1985 | Sarin et al. . |
| 4,671,841 | 6/1987 | Stephens . |
| 4,749,150 | 6/1988 | Rose et al. . |
| 4,749,151 | 6/1988 | Ball et al. . |
| 4,759,513 | 7/1988 | Birbragher . |
| 4,947,958 | 8/1990 | Snyder . |
| 4,989,807 | 2/1991 | Foreman et al. . |
| 4,993,663 | 2/1991 | Lahte et al. . |
| 5,041,323 | 8/1991 | Rose et al. . |
| 5,114,102 | 5/1992 | Wang . |
| 5,136,837 | 8/1992 | Davison . |
| 5,137,230 | 8/1992 | Coffinberry . |
| 5,141,182 | 8/1992 | Coffinberry . |
| 5,222,698 | 6/1993 | Nelson et al. . |
| 5,297,765 | 3/1994 | Hughes et al. ................ 244/130 X |
| 5,368,258 | 11/1994 | Johnson et al. ................ 244/130 |
| 5,447,283 | 9/1995 | Tindell . |
| 5,490,602 | 2/1996 | Wilson et al. . |

*Primary Examiner*—Khanh Dang
*Attorney, Agent, or Firm*—Terry J. Anderson; Karl J. Hoch, Jr.

[57] ABSTRACT

A noise suppression system for a jet engine, the system having a substrate formed of open cell material, a layer of microporous material covering at least a portion of one surface of the substrate, a layer of substantially non-porous material covering at least one portion of an opposite surface of the substrate, and a pressurized air source for providing pressurized air to the substrate. The substrate, the microporous material, and the non-porous material are configured to define an inner surface of an inlet for the jet engine. The pressurized air is communicated from the substrate, through the microporous material, and into the inlet so as to provide a layer of less turbulent airflow along the inner surface of the inlet, thus mitigating noise generation.

10 Claims, 2 Drawing Sheets

NOISE SUPPRESSION SYSTEM FOR A JET ENGINE

FIELD OF THE INVENTION

The present invention relates generally to noise suppression and more particularly a noise suppression system for a jet engine which mitigates turbulent air flow at the inlet thereof and also absorbs noise caused by the compressor turbines proximate the engine inlet.

BACKGROUND OF THE INVENTION

In order to mitigate the noise generated by a jet engine, it is known to form the jet engine inlet and exhaust duct walls of noise absorbing material. This is particularly desirable for commercial passenger aircraft, since such aircraft are required to meet stringent government noise regulations. Such noise suppression for commercial passenger aircraft is also desirable so as to enhance the comfort of the passengers thereof.

Additionally, many localities have noise regulations which limit the amount of noise that an aircraft may make in order to prevent annoying nearby residents. This sometimes limits the types of aircraft that may utilize a particular airport. It also frequently imposes procedural restrictions upon aircraft which would otherwise be undesirable. For example, aircraft may be required to fly over designated neighborhoods of a prescribed minimum height. Flying at such a minimum altitude may undesirably increase fuel consumption and also possibly accelerate engine wear (particularly when the minimum altitude must be reached immediately after takeoff).

According to contemporary methodology, a noise suppressing material sold under the name DYNAROHR (a registered trademark of Rohr Industries, Inc.) is utilized extensively for this purpose. The DYNAROHR product is formed of a honeycomb material which is disclosed in U.S. Pat. No. 4,379,191, the contents of which are hereby incorporated by reference. This honeycomb material comprises a core having a plurality of open cells and which is sandwiched between an outer non-porous layer and an inner porous layer. The inner porous layer is in fluid communication with the open cells of the honeycomb material. A microporous sheet material, such as one comprised of finely woven stainless steel cloth, is bonded over the porous sheet and forms a part of the inner surface of the jet engine's inlet duct.

It is also known to suck air from the turbulent boundary layer about the jet engine inlet duct in an attempt to improve the laminar flow characteristics thereof. Such contemporary methodology for mitigating the noise generated by a jet engine is disclosed in U.S. Pat. No. 4,749,150, the contents of which are hereby incorporated by reference.

It is also known to form a sound mitigating structure comprising a plurality of passages, having an asymmetric cross-section wherein flared inlets and outlets thereof have a reduced diameter neck formed therebetween. Such construction is disclosed in U.S. Pat. No. 4,539,245, the contents of which are hereby incorporated by reference.

Although such sound suppressing materials and techniques have proven generally useful for their intended purposes, to date no such material has provided the degree of noise suppression desired for use in jet engine applications. As such, it is beneficial to provide a structure which substantially mitigates the noise generated by a jet engine, so as to facilitate compliance with governmental regulations and thus enhance passenger comfort and also mitigate the annoyance of people residing near an airport.

SUMMARY OF THE INVENTION

The present invention specifically addresses and alleviates the above-mentioned deficiencies associated with the prior art. More particularly, the present invention comprises a noise suppression system for a jet engine comprising a substrate formed of open cell material, a layer of microporous material covering at least a portion of one surface of the substrate, and a layer of substantially non-porous material (although the non-porous material may have openings formed therein where airflow is desired) covering at least a portion of an opposite surface of the substrate. A pressurized air source provides pressurized air to the substrate such that the pressurized air will flow through the layer of microporous material.

The substrate, microporous material, and the non-porous material are configured so as to define a portion of a jet engine inlet, including the inner surface thereof. The pressurized air is communicated from the substrate, through the microporous material, and into the jet engine inlet so as to provide a layer of less turbulent, substantially laminar airflow along the inner surface of the jet engine inlet, thus substantially mitigating noise generation from the jet engine.

According to the preferred embodiment of the present invention, the substrate comprises composite honeycomb material. Those skilled in the art will appreciate that various other open cell materials, particularly high temperature polymers, are likewise suitable.

The microporous material preferably comprises sheet metal, preferably sheet nickel which has been found to have desirable fabrication and acoustic qualities.

The microporous material comprises passages through which air is communicated from the substrate into the jet engine inlet. Passages comprise a flared passage inlet and a flared passage outlet. A constricted neck is formed in each passage intermediate the passage inlet and the passage outlet.

The dimensions of the passages have been specifically selected so as to optimize their noise absorption properties, as discussed in detail below.

The layer of substantially non-porous material preferably comprises sheet metal, preferably sheet aluminum.

The pressurized air source preferably comprises at least one header for distributing pressurized air throughout a portion of the substrate. Those skilled in the art will appreciate the use of a header is particularly desirable when a substrate comprised of honeycomb is utilized, so as to assure adequate distribution of pressurized air to each cell of the honeycomb structure. Such a header is generally necessary when a honeycomb material is utilized since the individual cells of the honeycomb structure are generally not in substantial fluid communication with one another. Further, as those skilled in the art will appreciate, the header may be of any desirable construction which so distributes the pressurized air. Those skilled in the art will appreciate that various such constructions are suitable.

The use of such a header is less important when the substrate is comprised of a material having substantially interconnected or open cells, such that the application of pressurized air to a small portion of the substrate results in air pressure being substantially communicated substantially therethroughout. The pressurized air source preferably comprises at least one manifold for distributing pressurized air to the substrate, via a header if so desired.

According to an alternate embodiment of the present invention, a plurality of layers of microporous material are formed in alternating laminar juxtaposition to a generally corresponding plurality of substrates, such that an alternating sandwich construction of microporous material and substrates is provided. The inner layer, that layer along the inside surface of the inlet, comprises a layer of microporous material, and the outer layer, i.e., the opposite layer, comprises a substantially non-porous material. As those skilled in the art will appreciate, such alternating layer construction provides enhanced noise reduction. Further, a single layer of substrate and microporous material may be utilized in some locations within the jet engine inlet, while a plurality of alternating layers of microporous material and substrate are utilized in other portions thereof. Thus, the construction of the present invention may be tailored or optimized to provide desirable noise suppression, structural strength, and/or economic construction, as desired.

Brief Description of the Drawings FIG. 1 is a cross-sectional side view of a prior art jet engine illustrating the operative environment of the present invention;

Figure 3:
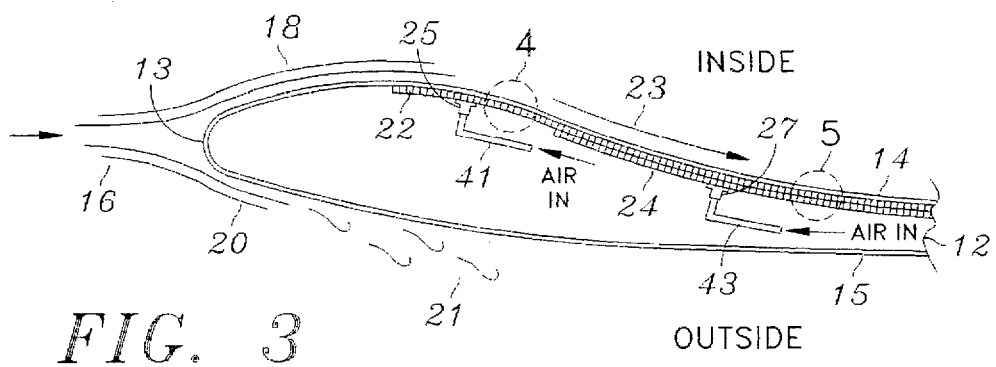
FIG. 3 is a cross-sectional view of the lower portion of the jet engine inlet duct showing the noise suppression system of the present invention resulting in more nearly laminar air flow across the inner surface of the duct.
Figure 4:
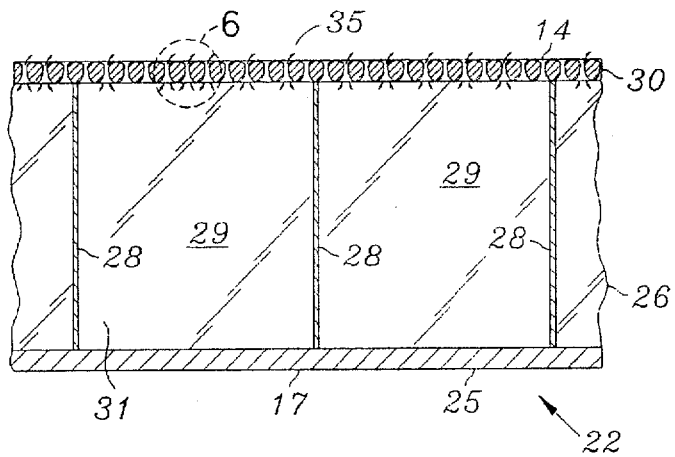
FIG. 4 is an enlarged cross-sectional side view of a portion of the noise suppression system taken along line 4 of FIG. 3.
Figure 5:
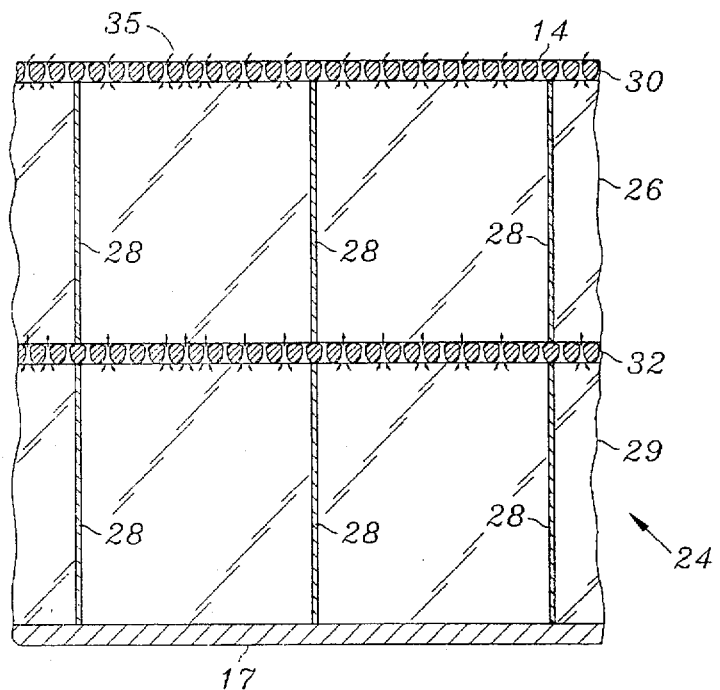
Figure 6:
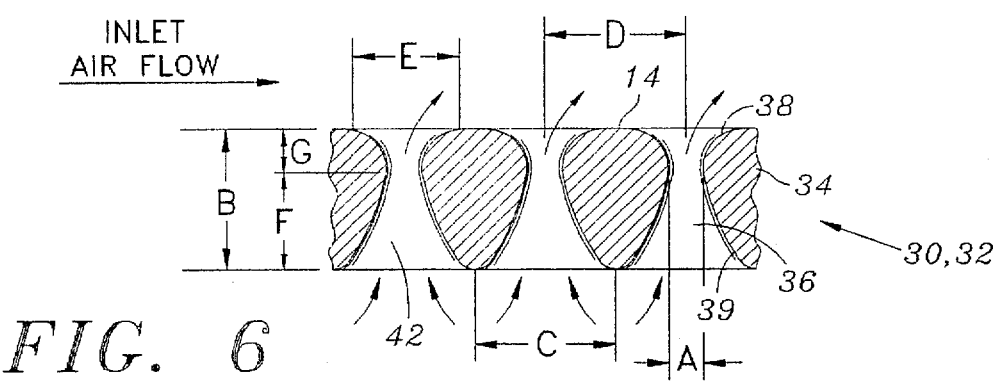

FIG. 5 is a cross-sectional side view of the noise suppression system taken along line 5 of FIG. 3 and showing two honeycomb substrate layers, each honeycomb substrate layer having a microporous material covering formed upon the inner surface thereof and a generally non-porous covering formed upon the outer surface of the layered assembly; and FIG. 6 is an enlarged cross-sectional side view of representative microporous layers, such as those of FIGS. 4 and 5, taken along line 6 of FIG. 4.

DETAILED DESCRIPTION OF THE PREFERRED EMBODIMENT

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
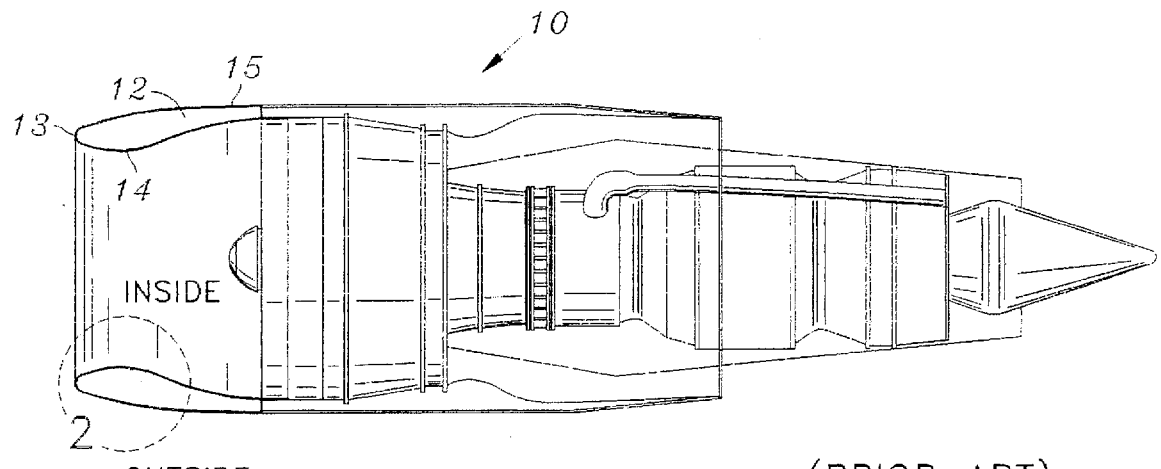

The noise suppression system of the present invention is illustrated in FIGS. 3–6 which depict a presently preferred embodiment of the invention. FIG. 1 depicts the environment in which the present invention is operative and FIG. 2 depicts a prior art engine inlet generating turbulent air flow along the inner surface thereof.

Referring now to FIG. 1, a contemporary turbo fan jet engine 10 comprises an inlet duct 12 having a leading edge 13, an inner surface 14 and an outer surface 15.

Figure 2:
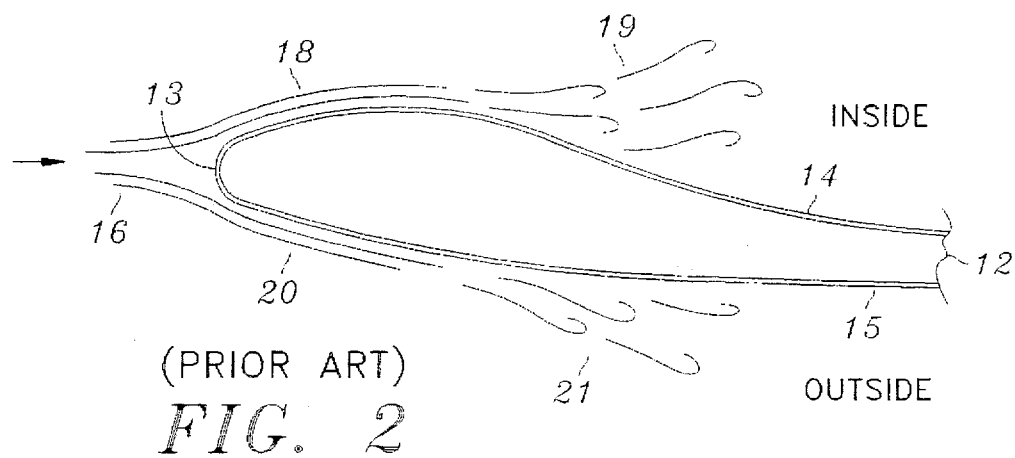
FIG. 2 is a cross-sectional side view of the lower portion of the jet engine inlet duct, taken along line 2 of FIG. 1, showing turbulent air flow produced thereby.

As shown in FIG. 2, in the absence of a noise suppression system, incident air stream 16 is divided by the leading edge 13 of the inlet duct 12 into an inside air stream 18 and an outside air stream 20. The inside air stream 18 breaks up into inside turbulent flow 19 and the outside air stream 20 similarly breaks up into outside turbulent air flow 21. As those skilled in the art will appreciate, such turbulent flow increases the noise generated by the jet engine 10, and also has some impact upon the operational performance thereof.

Referring now to FIGS. 3 through 6, according to the preferred embodiment of the present invention the inner surface 14 of the jet engine inlet duct 12 comprises a noise suppression system comprising a substrate formed of an open cell material, preferably honeycomb material 26, having a layer of microporous material 30 formed upon the inner surface thereof and having a layer of substantially non-porous material 17 formed along the outer surface thereof, thus defining a single layer 22 (FIG. 4) of the noise suppression system.

Optionally, a double layer 24 (FIG. 5) of the noise suppression system may be formed, preferably aft (FIG. 3) of the single layer 22 thereof, if desired. As those skilled in the art will appreciate, such a double layer 24 of the noise suppression system more effectively suppresses noise generated by the jet engine and is generally more useful downstream along the inlet air flow, where greater turbulence is likely to occur.

With particular reference to FIG. 3, an air stream 16 is divided by the leading edge 13 of the jet engine inlet 12 into an inner airstream 18 and an outer airstream 20 as in the prior art. Also, as in the prior art, the outer airstream 20 breaks up into turbulent air flow 21. However, unlike the inner air stream 18 of the prior art as shown in FIG. 2, the inner air stream 18, according to the present invention, does not break up into turbulent air, but rather defines generally laminar air flow 23 over the inner surface 14 of the jet engine inlet duct 12.

Air is pumped, preferably through manifolds 41, 43 and headers 25, 27, into the open cell material or honeycomb 26 from a pressurized air source (not shown). As those skilled in the art will appreciate, various pressurized air sources such as compressors, compressed air containers, or compressed air from various portions of a jet engine itself, are suitable. Air thus flows through the honeycomb 26, 29 and the microporous material 30, 32.

The cushion of air 35 thus provided immediately along the inner surface 14 of the inlet duct 12 tends to isolate the inside air stream 18 from the roughness inherent to the inner surface 14 of the inlet duct 12, and consequently from the frictional effects thereof, such that generally smooth or laminar air flow 23 is maintained substantially along the inner surface 14 of the air duct 12. In this manner, the turbulence which contributes substantially to the noise generated by the jet engine is substantially mitigated, and the operational performance of the jet engine is enhanced.

The layer of non-porous material 17 prevents pressurized air from undesirably leaking from the honeycomb 26 of the single layer 22 or the honeycomb 26, 29 of the double layer 24. The layer of non-porous material 17 is preferably comprised of sheet metal, preferably aluminum. Thus, the pressurized air is communicated through the open cells 31 of the honeycomb material 26 to the layer of microporous material 30 of the single layer 22 and to both of the layers of microporous material 30, 32 of the double layer 24.

The pressurized air is forced through generally hourglass shaped micropores or passages 36 (FIG. 6) formed in the microporous layers 30, 32 such that a boundary layer of air is formed along the inside surface 14 of the noise suppression system, so as to reduce air turbulence and facilitate laminar air flow therealong, as discussed above.

As those skilled in the art will appreciate, the layers of honeycomb material 26, 29 are comprised of a plurality of walls or partitions 28, which separate individual open cells 31 from one another. The open cells 31 have openings formed at the ends thereof, such that air is easily communicated therethrough. As those skilled in the art will further appreciate, the use of such honeycomb material generally necessitates the use of a header 25, 27 for applying pressurized air to each of the open cells 31. Such distribution of air may be accomplished by providing apertures within the generally non-porous material 17, by providing interconnecting passageways among the individual cells 31, or by providing a slight gap between the generally non-porous material 17 and the honeycomb material 26 so as to facilitate air flow therebetween. Alternatively, the individual cells 31 may be in fluid communication with one another, such that pressurized air is readily transmitted therebetween. This may be accomplished by forming openings through the partitions 28, or by notching or roughening the outer surfaces thereof, so as to prevent an airtight seal with the non-porous material 17.

Alternatively, the non-porous material 17 may be applied such that it generally does not contact either some or all of the partitions 28 of the honeycomb material 26, 29, such that air readily flows into substantially all of the cells thereof. Alternatively, the header may be formed integrally with the non-porous material 17 by forming air passages therein. The header 25, 27, if utilized, assures pressurized air flow to substantially all of the open cells 31 of the honeycomb material 26.

In any event, the present invention is configured such that pressurized air is provided to substantially all of the open cells 31 of the honeycomb material 26, 29 and readily flows through substantially all of the passages 36. Those skilled in the art will appreciate that various different configurations of the open cells 31 and/or the generally non-porous material 17 are suitable to accomplish such functionality.

Noise inherently generated by the high velocity inrush of air through the jet engine inlet 12 is substantially absorbed by the single layer 22 and double layer 24 of the noise suppression system of the present invention. Thus, noise suppression according to the present invention is primarily due to two different factors. First, turbulent air flow along the inner surface 14 of the engine inlet 12 is reduced, thereby mitigating noise generation due to such turbulence. Second, any noise generated by the jet engine around the inlet thereof tends to be absorbed by the microporous material 30, 32 and the honeycomb material 26, 29.

Multiple layers of the noise suppression system of the present invention may be formed by providing a plurality of substrates or honeycomb material 26, 29 in alternating laminar juxtaposition to a generally corresponding number of layers of microporous material 30, 32 in a sandwich-like fashion. The number of layers is dependent upon the desired acoustic attenuation and structural strength properties. As shown in FIG. 5, two such layers are provided. Those skilled in the art will appreciate that any desired number of such layers may similarly be provided.

With particular reference to FIG. 6, the microporous material 30, 32 preferably comprises sheet metal having a plurality of micropores or passages 36 formed therethrough such that sound is readily absorbed thereby and such that air may flow readily therethrough. The microporous layers 30, 32 are preferably formed of sheet metal, preferably nickel, because of the desirable acoustic and fabrication properties thereof. Each of the passages 36 is preferably formed to have a generally hourglass-like shape which necks down comparatively rapidly at the inner surface thereof and necks down comparatively slowly at the outer surface thereof. Thus, each of the passages 36 preferably comprises a passage inlet 39, a passage outlet 38, and a neck 42 formed intermediate the passage inlet 39 and the passage outlet 38 and having a diameter substantially smaller with respect thereto. The diameter of the neck 42, dimension A, is preferably substantially smaller than the thickness of the sheet metal 34, dimension B, of which the first 30 and second 32 microporous coverings are comprised.

More particularly, the diameter of the passage at the neck 42, dimension A, is preferably approximately 0.002 inch; the thickness of the sheet metal of which the microporous layers 30, 32 are formed, dimension B, is preferably between approximately 0.012 inch and 0.035 inch, preferably approximately 0.0118 inch; the diameter of the inlet, dimension C, of each passage is preferably approximately 0.010 inch; the distance between adjacent openings, dimension D, is preferably approximately 0.010 inch; the diameter of the outlet, dimension E, of each passage is preferably approximately 0.0065 inch; the distance from the inlet surface to the narrowest portion of the neck, dimension F, is preferably approximately 0.00876 inch; and the distance from the narrowest portion of the neck 42 to the outlet surface, dimension G, is preferably approximately 0.00305 inch.

The microporous material 30 is preferably formed of microporous nickel so as to have a porosity of preferably between approximately 3% and 8%, preferably approximately 3.14% and a mesh size of approximately 125. The ratio of the neck diameter to sheet thickness is preferably approximately 3 or greater.

Thus, according to the present invention, the noise generated by a jet engine is substantially reduced and engine performance is enhanced. Noise reduction is accomplished by mitigating air turbulence across the engine inlet. Mitigating turbulence reduces the inherent noise caused thereby and also reduces the amount of noise caused by the air flow striking the compressor turbines. Smooth or laminar air flow striking the compressor turbines results in substantially less noise generation than does turbulent air flow striking the compressor turbines. Further, noise inherently generated by the compressor turbines is absorbed by the microporous layer and substrate. Jet engine performance is enhanced by providing more efficient air flow through the engine inlet by mitigating the turbulence thereacross.

It is understood that the exemplary method for jet engine noise suppression described herein and shown in the drawings represents only a presently preferred embodiment of the invention. Indeed, various modifications and additions may be made to such embodiment without departing from the spirit and scope of the invention. For example, those skilled in the art will appreciate that various numbers of alternating layers of open cell material and microporous material may be utilized, as desired. Further, various different shapes and configurations of the passages or micropores are contemplated. Further, it is contemplated that the present invention may similarly be utilized in the outlet duct of a jet engine.

Thus, these and other modifications and additions may be obvious to those skilled in the art and may be implemented to adapt the present invention for use in a variety of different applications.

What is claimed is:

1. A noise suppression system for a jet engine, the system comprising:

a) a substrate formed of open cell material;

b) a layer of microporous material covering at least a portion of one surface of the substrate, wherein the microporous material comprises passages through which air is communicated into the inlet, each of the passages comprising a flared passage inlet, a flared passage outlet, and a constricted neck formed intermediate the passage inlet and the passage outlet, wherein:

i) a diameter of the neck is approximately 0.002 inch;

ii) a thickness of the layer of microporous material is approximately 0.0118 inch;

iii) a diameter of the flared passage inlet is approximately 0.010 inch;

iv) a distance between adjacent passages is approximately 0.010 inch;

v) a diameter of the flared passage outlet is approximately 0.0065 inch;

vi) a distance from the inlet side of the layer of microporous material to the neck is approximately 0.00876 inch;

vii) a distance from the outlet side of the layer of microporous material to the neck is approximately 0.00305 inch;

c) a layer of non-porous material covering at least a portion of an opposite surface of the substrate; and d) a pressurized air source for providing pressurized air to the substrate via at least one manifold;

e) wherein the substrate, the microporous material, and the non-porous material are configured to define at least an inner surface of an inlet for the jet engine, and wherein the pressurized air is communicated from the substrate, through the microporous material, and into the inlet so as to provide a layer of less turbulent airflow along an inner surface of the inlet, thus mitigating noise generation.

2. The noise suppression system for a jet engine as recited in claim 1, wherein the substrate comprises honeycomb material.

3. The noise suppression system for a jet engine as recited in claim 1, wherein the substrate comprises a composite honeycomb material.

4. The noise suppression system for a jet engine as recited in claim 1, wherein the microporous material comprises sheet metal.

5. The noise suppression system for a jet engine as recited in claim 1, wherein the microporous material comprises nickel.

6. The noise suppression system for a jet engine as recited in claim 1, wherein the ratio of the thickness of the layer of microporous material to the diameter of the neck of each passage is greater than 3.

7. The noise suppression system for a jet engine as recited in claim 1, wherein the layer of substantially non-porous material comprises sheet metal.

8. The noise suppression system for a jet engine as recited in claim 1, wherein the pressurized air source comprises at least one header for distributing pressurized air throughout the substrate.

9. The noise suppression system for a jet engine as recited in claim 1, wherein the pressurized air source comprises at least one manifold for distributing pressurized air to the substrate.

10. The noise suppression system for a jet engine as recited in claim 1, wherein a porosity of the microporous material is between approximately 3% and approximately 8%.

* * * * *